US011215351B2

(12) United States Patent
Girouard et al.

(10) Patent No.: US 11,215,351 B2
(45) Date of Patent: Jan. 4, 2022

(54) LAMP POST WITH FUNCTIONAL MODULES

(71) Applicant: Schreder S.A., Brussels (BE)

(72) Inventors: Stéphane Girouard, Mortier (BE); Guy Pluimers, Awans (BE); Hervé Damoiseau, Saive (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 16/642,500

(22) PCT Filed: Aug. 29, 2018

(86) PCT No.: PCT/EP2018/073208
§ 371 (c)(1),
(2) Date: Feb. 27, 2020

(87) PCT Pub. No.: WO2019/043045
PCT Pub. Date: Mar. 7, 2019

(65) Prior Publication Data
US 2020/0182441 A1  Jun. 11, 2020

(30) Foreign Application Priority Data

Aug. 29, 2017 (BE) .................................. 20175597
Aug. 29, 2017 (BE) .................................. 20175598
(Continued)

(51) Int. Cl.
*F21S 8/08* (2006.01)
*F21V 29/508* (2015.01)
(Continued)

(52) U.S. Cl.
CPC ............ *F21V 29/508* (2015.01); *F21S 8/085* (2013.01); *F21S 8/088* (2013.01); *F21V 21/10* (2013.01);
(Continued)

(58) Field of Classification Search
CPC ............ F21S 8/085; F21S 8/086; F21S 8/088; F21W 2111/02; F21W 2111/023; F21W 2131/103
See application file for complete search history.

(56) References Cited

U.S. PATENT DOCUMENTS

| | | |
|---|---|---|
| 5,570,546 A | 11/1996 | Butterworth et al. |
| 2004/0248511 A1 | 12/2004 | Flynn |

(Continued)

FOREIGN PATENT DOCUMENTS

| | | |
|---|---|---|
| EP | 2169647 A1 | 3/2010 |
| WO | 1998053522 A1 | 11/1998 |

(Continued)

OTHER PUBLICATIONS

PCT International Search Report and Written Opinion, PCT International Application No. PCT/EP2018/073208, dated Jan. 21, 2019, 14 pages.

*Primary Examiner* — Sean P Gramling
(74) *Attorney, Agent, or Firm* — McDonnell Boehnen Hulbert & Berghoff LLP

(57) ABSTRACT

A lamp post comprising a support pole; a light module supported by the support pole, said light module comprising a light source; an antenna module supported by the support pole; said antenna module comprising an antenna configured for receiving and emitting cellular data; and a base station module; wherein the base station module comprises a housing and base station circuitry mounted in said housing; wherein the base station circuitry is coupled to the antenna; wherein the base station module is attached to an external surface of the support pole and carried by the support pole.

20 Claims, 10 Drawing Sheets

(30) Foreign Application Priority Data

Aug. 29, 2017 (BE) .................................... 20175599
Jun. 18, 2018 (BE) .................................... 20185411

(51) Int. Cl.

| | |
|---|---|
| *F21V 29/60* | (2015.01) |
| *F21V 29/83* | (2015.01) |
| *F21V 23/00* | (2015.01) |
| *H01Q 1/02* | (2006.01) |
| *H01Q 1/12* | (2006.01) |
| *H01Q 1/42* | (2006.01) |
| *H01Q 1/44* | (2006.01) |
| *F21V 21/10* | (2006.01) |
| *H01Q 1/24* | (2006.01) |
| *H04W 88/08* | (2009.01) |
| *F21Y 115/10* | (2016.01) |
| *F21W 111/02* | (2006.01) |
| *H04B 1/38* | (2015.01) |

(52) U.S. Cl.
CPC ............ *F21V 23/008* (2013.01); *F21V 29/60* (2015.01); *F21V 29/83* (2015.01); *H01Q 1/02* (2013.01); *H01Q 1/1242* (2013.01); *H01Q 1/246* (2013.01); *H01Q 1/42* (2013.01); *H01Q 1/44* (2013.01); *H04W 88/08* (2013.01); *F21W 2111/02* (2013.01); *F21Y 2115/10* (2016.08); *H04B 1/38* (2013.01)

(56) References Cited

U.S. PATENT DOCUMENTS

2013/0083516 A1     4/2013   Yoon
2015/0349399 A1*  12/2015   Lasier ................. H01Q 1/1242
                                                                        343/721
2020/0116318 A1*   4/2020   Bembridge ............ F21V 21/10

FOREIGN PATENT DOCUMENTS

WO        2012083354  A1      6/2012
WO        2015183925  A1     12/2015

* cited by examiner

LAMP POST WITH FUNCTIONAL MODULES

CROSS-REFERENCE TO RELATED APPLICATION

The present application is a national stage entry of PCT/EP2018/073208 filed Aug. 29, 2018, which claims priority to BE 20175597 filed on Aug. 29, 2017, BE 20175598 filed on Aug. 29, 2017, BE 20175599 filed on Aug. 29, 2017, and BE 20185411 filed on Jun. 18, 2018, the contents of each of which are hereby incorporated by reference.

FIELD OF INVENTION

The field of the invention relates to lamp posts, in particular lamp post in the form of outdoor luminaires. Particular embodiments relate to the field of modular lamp posts comprising a number of functional modules.

BACKGROUND

EP 3 076 073 B1 in the name of the applicant discloses a modular lamp post which is readily assembled and installed in the field whilst providing rigidity, structural integrity and sealing. The lamp post comprises a plurality of modules mounted on a support pole. The modules are connected to one another by respective module connectors and one module thereof is connected to the support pole by a module connector. EP 3 076 073 B1 is included herein by reference.

Further it is known to include base station functionalities in separate cabinets adjacent a lamp post, wherein an antenna module is attached to the lamp post.

SUMMARY

The object of embodiments of the invention is to provide an improved lamp post allowing integrating additional functionalities such as base station functionalities in the lamp post. The object of particular embodiments is to allow integrating base station functionalities in existing lamp posts in an improved manner.

According to a first aspect of the invention there is provided a lamp post comprising a support pole, a light module, an antenna module and a base station module. The light module is supported by the support pole, and comprises a light source. The antenna module is supported by the support pole, and comprises an antenna configured for receiving and emitting cellular data. The base station module comprises a housing and base station circuitry mounted in said housing. The base station circuitry is coupled to the antenna. The base station module is attached to an external surface of the support pole and is carried and supported by the support pole.

Embodiments are based inter alia on the inventive insight that by attaching the base station module to an external surface of the support pole such that the base station module is carried by the support pole, it is not necessary to provide an additional foundation for the base station module contrary to prior art solutions which require an additional cabinet adjacent the support pole. The inventors realized that typical support poles of lamp posts are capable of supporting the weight of typical base station circuitry in a sort of "side" module attached to the support pole. Also compared to prior art solution where the base station circuitry is included in the support pole, the present invention is advantageous since it does not require large dimensions for the support pole and foundation for the support pole.

It is noted that the term "supported" as in "the light module is supported by the support pole" and "the antenna module is supported by the support pole" does not imply that the light module needs to be directly fixed on the support pole; indeed, there may be intermediate modules or elements between the support pole and the light module and/or between the support pole and antenna module; the support pole supports the light module, the antenna module and any intermediate modules or elements.

According to an exemplary embodiment, the support pole is fixed in the ground and the housing of the base station module is at a distance above the ground. It is noted that the housing may also be in contact with the ground as long as it is carried by the support pole.

According to an exemplary embodiment, the housing of the base station module comprises a structurally rigid ribbed frame attached to the support pole; a fixing means for fixing the ribbed frame against an external surface of the support pole; and one or more panels attached to the ribbed frame, so as to enclose the ribbed frame. In that manner, first the ribbed frame may be fixed to the support pole, whereupon the base station circuitry may be arranged so that it is supported by the ribbed frame, and the one or more panels may be arranged to the ribbed frame. This allows for an easy assembly of the base station module. Also such a base station module can be easily added to existing lamp posts. The fixing means may be e.g. two or more screws or bolts.

Preferably, the ribbed frame is attached to the support pole at a first and second position being at a distance of each other seen in an axial direction of the support pole. Such a positioning ensures a robust fixation to the support pole. It is noted that the ribbed frame may also be attached at additional positions between the first and the second position at a distance of each other seen in an axial direction of the support pole.

According to an exemplary embodiment, the housing may be provided with one or more ventilation openings, e.g. a plurality of slits or holes. In an embodiment where the housing comprises one or more panels the plurality of slits may be arranged in the one or more panels, e.g. in two opposite panels of the housing, such that an air flow through the housing is created.

According to another exemplary embodiment the housing of the functional module, such as the base station module, comprises a bottom wall intended to be floating, a top wall and a peripheral wall between the bottom and top wall. The housing may cover or surround a portion of the support pole. The bottom wall may be provided with one or more lower air flow holes. The peripheral wall and/or said portion of the support pole, may be provided with one or more upper air flow holes. The provision of upper and lower air flow holes creates an air flow in the housing capable of appropriately cooling the functional circuitry in the housing, such as the base station circuitry. For example, the one or more upper air flow holes may be provided in an upper half of the peripheral wall and/or in an upper half of the portion of the support pole covered or surrounded by the housing. In that manner the air flow will pass over a sufficiently large portion of the height of the housing guaranteeing an adequate cooling of the functional circuitry in the housing. According to an exemplary embodiment, the one or more upper air flow holes are provided in the peripheral wall and are formed as one or more slits, preferably elongated slits extending in a horizontal direction. Slits extending in a horizontal longitudinal direction have the advantage that less water and/or dirt will enter in the housing whilst allowing the same amount of air to flow out as compared to holes having the same surface area but being elongated in a vertical direction. The peripheral wall may be provided with one or more outwardly protruding portions above the slits in order to further reduce the possibility of water and/or dirt entering inside the housing.

According to an exemplary embodiment, the light source comprises a plurality of light emitting diodes, e.g. an array of light emitting diodes, which may be arranged on a PCB. Further, a driver for driving the plurality of light emitting diodes, optionally in combination with a dimmer may be integrated in the lamp post in any known manner.

According to an exemplary embodiment the support pole is hollow, and the support pole is provided with a removable door providing access to an inner part of said support pole, wherein said door may be arranged substantially at the same height as the base station module, preferably substantially opposite to the base station module. In that manner the base station circuitry in the base station module can be accessed through the door in the support pole. However, it is also possible to remove one or more panels of the housing, in order to access the base station circuitry. Also, using this embodiment, the access to the door is kept free for maintenance activity or access to cables or additional modules.

According to an exemplary embodiment the housing of the base station module covers a surface area of the support pole; wherein the support pole is provided in said surface area with a first hole and a second hole positioned above the first hole seen in an axial direction of the support pole. The lamp post comprises an antenna connection cable from the antenna through an inner part of the support pole, through the second hole to the base station circuitry; and a power connection cable passing from a lower end of the support pole through the first hole to feed the base station circuitry. In that manner the antenna connection cable, e.g. a coaxial cable, can enter the base station module at a higher position than the power connection cable, resulting in shorter cable lengths and reduced interference. In an alternative embodiment, only one hole may be provided in said surface area, and both the antenna connection cable and the power connection cable may pass through said one hole.

According to an exemplary embodiment the housing of the base station module has a first width extending in a first direction perpendicular an axial direction of the support pole, said first width being inferior to an external diameter of the support pole. In other words, the housing is relatively narrow in width, resulting in a compact module. Such an embodiment will be particularly suitable for support poles with a relatively large external diameter.

Preferably, the housing of the base station module has a second width extending in a second direction perpendicular to the first width and to an axial direction of the support pole, said second width being superior to an external diameter of the support pole, preferably at least twice the external diameter of the support pole. In other words, the housing may be relatively narrow but may protrude over a relatively longer distance (the second width) in a direction away from the support pole, such that it still has sufficient volume to enclose the base station circuitry. However, embodiments having a second width inferior to the external diameter of the support pole also fall within the scope of the invention.

In an alternative embodiment the first width may be larger than the external diameter of the support pole. Especially for smaller diameter poles such an embodiment may be useful. In a first possible embodiment the housing may extend on one side of the support pole, not surrounding the support pole. In a second possible embodiment the housing may surround the support pole. For example, the housing may have a cylindrical peripheral wall. However, in order to keep the door free, it may be preferred that the housing extends on only one side of the support pole.

It is further noted that multiple functional modules may be provided to the support pole. If the functional module does not surround the support pole, there may be provided e.g. two functional modules on opposite sides of the support pole. In other embodiments multiple functional modules may be provided one above the other, or one next to the other.

According to an exemplary embodiment the housing protrudes sideways from the external surface of the support pole in one direction, and does not surround the support pole. In that manner a housing with a more or less parallelepipedic shape or box shape can be formed, which is a suitable shape to include the base station circuitry which usually consists of parallelepipedic or box shaped units.

According to an exemplary embodiment the antenna module is arranged in a position above the base station module. Generally, it is desirable to arrange the antenna module in a relatively high position. However, usually it is preferred to position the antenna module at a lower position than the light module. In other words, preferably, the antenna module is arranged between the base station module and the light module, seen in an axial direction of the support pole. In an alternative embodiment the antenna module could be arranged above the light module, e.g. as the highest module of the lamp post.

According to an exemplary embodiment the antenna is a directional antenna. Preferably, the antenna module has a housing which is arranged in line with an axial direction of the support pole and which is rotatable around the axial direction of the support pole, such that said housing is orientable for orienting the directionality of the receiving and emitting of the antenna. For example, the antenna may be included in a module as disclosed in EP 3 076 073 B1 which is included herein by reference. By using module connectors as disclosed in EP 3 076 073 B1 with two connector portions which can be clamped around round end parts of the modules, the module can be rotated around the axial direction of the support pole in the desired position and then fixed by the connector portions.

According to an exemplary embodiment the base station circuitry comprises a combiner, a base transceiver unit, and a wired or wireless transmission interface configured for being connected to a communication network. The combiner is connected to the antenna and to the base transceiver unit; and the base transceiver unit is further connected to the transmission interface. The transmission interface may be e.g. a fiber to copper interface. The combiner may be a dual band RF combiner. Further the base station circuitry may comprise power management circuitry to provide the required power to the combiner, the base transceiver unit and the wired or wireless transmission interface.

According to an exemplary embodiment the base station circuitry is configured for communicating using 2G (GSM), 2.5G (EDGE), 3G (UMTS), 4G (LTE), 5G or any other future standard.

According to an exemplary embodiment the housing of the base station module has an upper surface, preferably sloping downward away from the support pole, wherein a human interface device such as a display and/or a battery charger and/or a button and/or a sensor (such as a microphone, a voice recorder, an image sensor, etc.) and/or a loudspeaker are integrated in the upper surface. The battery charger may be e.g. a wireless mobile phone charger. The display may be an interactive screen for providing information. In such embodiments the circuitry required for the battery charger and/or the display may also be provided in the housing of the base station module, resulting in a multifunctional module. Further, advertising screens may be provided on the housing of the base station module.

According to a second aspect of the invention, there is provided a lamp post comprising a support pole, a light module and a functional module. The light module is supported by the support pole, and comprises a light source. The functional module comprises a housing and functional circuitry mounted in said housing. The functional module is carried by the support pole, and the housing thereof comprises a frame, such as a ribbed frame; a fixing means for fixing the frame against the external surface of the support pole; and one or more panels attached to the frame, so as to enclose the frame.

Preferred embodiments thereof are disclosed in the dependent claims.

The functional module may have features similar to the features of the base station module with this difference that the functional module may comprise other functional circuitry instead of or in addition to base station circuitry. The technical advantages set out above for the base station module apply mutatis mutandis for the functional module.

Examples of other functional circuitry which may be included in the functional module in addition to or instead of the base station circuitry, are any one or more of the following:

power management circuitry comprising e.g. one or more of: a power meter, a fuse, a line protection, a circuit breaker, an electrical connection for multiple power lines, a clock, an astroclock, a power supply module, an PLC, a computer, a communication module, display circuitry, etc.; preferably the power management circuitry is configured to manage the provision of power to one or more lamp posts, preferably at least three lamp post, e.g. more than ten lamp posts. In such embodiments power connection cables pass from the functional module through the support pole to other lamp posts, e.g. underground.

telecommunication circuitry for wired or wireless communication, which can comprise at least one of: an optical fiber connection, a fiber to copper interface, a fiber patch panel, a modem, a router, a switch, a patch panel, a network video recorder (NVR), a computer;

audio system management circuitry which can comprise at least one of: an amplifier, a transformer, a media player (connected to network or not), electrical connections for multiple loudspeaker lines, a computer;

WiFi circuitry, wherein an antenna for receiving WiFi signals may be integrated either in the functional module or in a separate antenna module as in the exemplary embodiment of the lamp post with a base station module;

charger circuitry, e.g. phone/computer/tablet charger circuitry or vehicle charger circuitry or UAV charger circuitry (e.g. drone charger circuitry);

an environmental sensor such as a sound sensor, a microphone, a voice recorder, a detector of $CO_2$, $NO_x$, smoke, or any other pollutant sensor, or an image sensor, etc., and the associated circuitry;

a human interface device (HID) and the associated circuitry, e.g. a camera, a loudspeaker, a button, a display, etc.

a signaling device, e.g. a light ring capable of performing signaling;

a mechanical and/or electrical plug-in device, e.g. a universal plug-in module, e.g. a mechanical device to fix a flag, a waste bin, etc.; a socket plug-in device.

According to an exemplary embodiment, a top wall of the housing of the functional module is formed by an inclined upper surface. Preferably, said upper surface slopes downward away from the support pole. Optionally a human interface device or an advertisement device is integrated in the upper surface. The human interface device may be e.g. a display and/or a battery charger and/or a button, a display, and/or a sensor. The battery charger may be e.g. a wireless mobile phone charger. The display may be an interactive screen for providing information. In such embodiments the circuitry required for the battery charger and/or the display may also be provided in the housing of the functional module. The sensor may comprise for example any one of the following: a microphone, a detector of $CO_2$ and/or $NO_x$ and/or smoke, a voice recorder, etc. The sensor may be coupled to the display such that information is displayed which is based on the sensed signals. For example, a voice recorder may record a question of a person, and an answer to the question may be presented on the display. The advertising device may be e.g. an advertising screen. Also on the peripheral wall of the housing one or more advertising screens may be provided.

In an embodiment where the housing of the functional module surrounds the support pole the inclined upper surface may be a conical or pyramid-shaped upper surface. In an embodiment with a box like housing, the upper surface may be a more or less rectangular flat inclined surface.

According to yet another aspect of the invention there is provided a lamp post comprising a support pole; a light module supported by the support pole and comprising a light source; and a first and a second antenna module. The first and second antenna module are arranged one above the other seen in an axial direction of the support pole and are supported by the support pole. The first antenna module comprises a first housing and a first antenna, preferably a directional antenna, arranged in said first housing and configured for receiving and emitting cellular data. The second antenna module comprises a second housing and a second antenna, preferably a directional antenna arranged in the second housing and configured for receiving and emitting cellular data. The first and second antenna module are rotatable around the axial direction of the support pole, such that said first and second antenna module are orientable for orienting the directionality of the receiving and emitting of the first and second antenna. The first and second antenna may be the same or different.

In a preferred embodiment the lamp post further comprises a base station module comprising base station circuitry; wherein the base station circuitry is coupled to the first and second antenna. However, it is noted that according to this aspect the base station module may also be provided as a separate unit or cabinet at a distance of the lamp post. In another embodiment the lamp post further comprises telecommunication circuitry, e.g. a WiFi circuitry, wherein the telecommunication circuitry is coupled to the first and second antenna.

In a preferred embodiment the first and second antenna module are arranged in a position above the base station module. Preferably, the first and second antenna modules are arranged between the base station module and the light module, seen in the axial direction of the support pole. In another embodiment, the light module is arranged in a position above the first and second antenna module.

In an exemplary embodiment the light module, the first antenna module and the second antenna module are arranged in variable order one above another, aligned with the support pole, wherein optionally further modules are inserted in line with the support pole.

Preferred embodiments thereof are disclosed in the dependent claims. Such embodiments may include a base station module with the same technical advantages as disclosed above for the first aspect.

In typical embodiments the support pole may be fixed in the ground, and a bottom wall of the functional module, such as the base station module, will be at a distance from the ground. In such cases the support pole is typically oriented substantially vertically. In other embodiments the support pole may be fixed in a wall and may extend at least partly horizontally or at an angle. In both embodiments the bottom wall may be floating with an air path present underneath the bottom wall.

It is noted that the support pole may be one integral pole, e.g. a metal pole, or may consist of one or more modules arranged one above the other in order to form a pole like structure.

According to an exemplary embodiment, the housing of the functional module, such as the base station module, comprises at least one panel in the form of a side door for providing access to an internal space of the housing. In that manner operators can access the functional circuitry, such as the base station circuitry, easily. The peripheral wall of the housing may comprise at least two side doors for providing access to an internal space of the housing. Using multiple doors may facilitate the mounting of and/or access to the functional circuitry and/or may allow different operators to have access to different parts of the housing.

One or more upper ventilation holes may be provided in the at least one side door and/or in other portions of the peripheral wall. One or each side door may be provided with a locking device, preferably a three-point locking device. In that manner the functional module can be made vandalism-proof. Further features may be added to increase the resistance against vandalism, such as the provision of an edge on the inside of the housing, said edge bridging a gap between a closed door and an opening in the peripheral wall. In that manner it can be avoided that the door is forced by inserting a thin flat tool in the gap. Preferably, the one or more side doors are fixed to the rest of the housing using hinges fixed to an internal portion of the housing, so that the hinges are not accessible from the exterior of the housing.

According to an exemplary embodiment the housing of the functional module, such as the base station module, is provided with at least one separation wall dividing an internal space of the housing into at least two compartments. The at least two compartments may be accessible by at least two side doors included in the housing. The at least two compartments may comprise a first and a second compartment separated by a vertical separation wall and the at least two side doors may comprise a first door and a second door providing access to the first and second compartment, respectively. The vertical separation wall may be extending from the support pole outwardly, e.g. in a radial plane, creating a first and second compartment on opposite sides thereof. In such embodiments, the first door and the second door may form opposite wall portions of the peripheral wall. In other embodiments the vertical separation wall may extend at a distance of the support pole creating two adjacent compartments, one closer to the support pole and one further away from the support pole. The first door and the second door may then form adjacent wall portions of the peripheral wall. The second door may be located at the same side of the housing as the first door, or the first and second door may be located on opposite sides of the housing. In such embodiments the vertical separation wall may be provided with one or more air flow holes to allow the passage of air from the second compartment to the first compartment. The skilled person understands that also various combinations with more than two compartments are possible, e.g. in an embodiment with one radial separation wall and a further separation wall on each side of the radial separation wall, four compartments may be present.

In addition or alternatively, the at least two compartments may comprise a first and a second compartment separated by a horizontal separation wall. In such an embodiment the at least two side doors may comprise a first door and a second door providing access to the first and second compartment, respectively, said second door being located below said first door. The second door may be located at the same side of the housing or on opposite sides of the housing. In such embodiments the horizontal separation wall may be provided with one or more air flow holes to allow the passage of air from the second compartment to the first compartment located above the second compartment. The upper air flow holes are then preferably provided in a wall portion of the peripheral wall delimiting the first compartment and/or in a portion of the support pole delimiting the first compartment.

According to an exemplary embodiment, at least one fixation plate is provided in the housing of the functional module, such as the base station module, wherein the functional circuitry is fixed at least partly against the fixation plate. For example two fixations plates may be provided at a distance of each other in an opening of a peripheral wall of the housing, wherein the opening is closable by a door. The or each fixation plate may be provided with a plurality of fixation holes for cooperating with fixation means. The use of one or more fixation plates not only increases the rigidity of the functional module but also makes the installation and/or maintenance of the functional circuitry easier.

According to an exemplary embodiment, a fan is arranged in the housing of the functional module, and/or in the support pole. The fan is preferably arranged to increase the air flow through the functional module. Preferably the fan is arranged in the housing, e.g. in an upper or lower portion of the housing. If multiple compartments are present, there may be provided one fan in one of the compartments (with one or more air flow holes provided in the separation wall(s)), or there may be provided multiple fans in different compartments.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
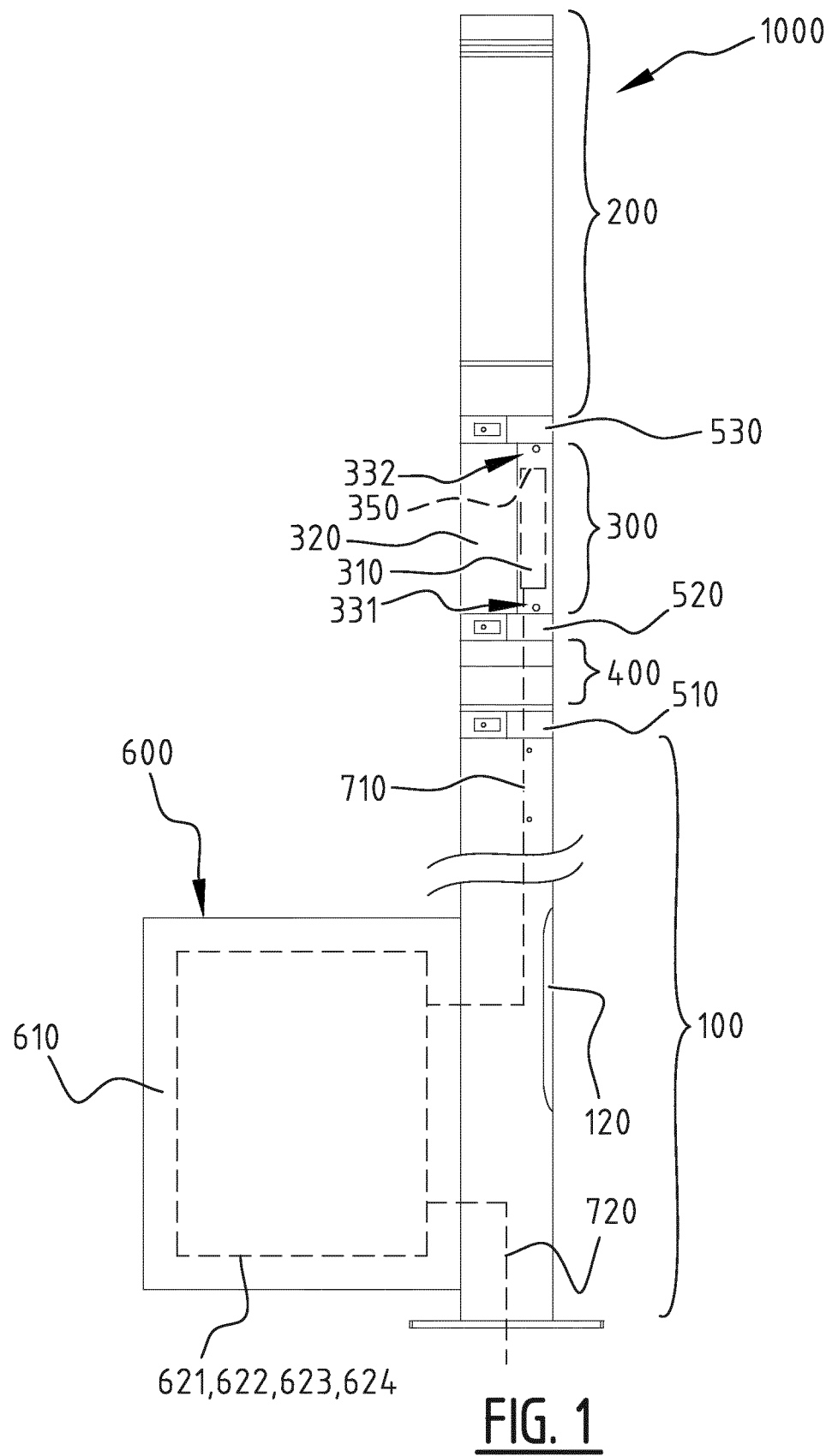
FIG. 1 illustrates schematically an exemplary embodiment of a lamp post of the invention.

FIG. 1 illustrates schematically an exemplary embodiment of a lamp post 1000. The lamp post 1000 comprises a support pole 100 and a plurality of modules 200, 300, 400, 600 supported by the support pole 100. The plurality of modules comprises a light module 200 comprising a light source, an antenna module 300 comprising an antenna 350 configured for receiving and emitting cellular data; and an optional further module 400, e.g. a Wi-Fi transceiver module, a loudspeaker module, a camera module, a video surveillance module, etc. Other examples functionalities which may be included in one or more modules 400 are any one or more of the following:

power management circuitry comprising e.g. one or more of: a power meter, a fuse, a line protection, a circuit breaker, an electrical connection for multiple power lines, a clock, an astroclock, a power supply module, an PLC, a computer, a communication module, display circuitry, etc.; preferably the power management circuitry is configured to manage the provision of power to one or more lamp posts, preferably at least three lamp post, e.g. more than ten lamp posts.

In such embodiments power connection cables pass from the functional module through the support pole to other lamp posts, e.g. underground.

telecommunication circuitry for wired or wireless communication, which can comprise at least one of: an optical fiber connection, a fiber to copper interface, a fiber patch panel, a modem, a router, a switch, a patch panel, a network video recorder (NVR), a computer;

audio system management circuitry which can comprise at least one of: an amplifier, a transformer, a media player (connected to network or not), electrical connections for multiple loudspeaker lines, a computer;

WiFi circuitry;

charger circuitry, e.g. phone/computer/tablet charger circuitry or vehicle charger circuitry or UAV charger circuitry (e.g. drone charger circuitry);

an environmental sensor such as a sound sensor, a microphone, a voice recorder, or a detector of CO2, NOx, smoke, or any other pollutant sensor, or an image sensor, etc., and the associated circuitry;

any human interface device (HID) and the associated circuitry;

a signaling device, e.g. a light ring capable of performing signaling;

a mechanical and/or electrical plug-in device, e.g. a universal plug-in module, e.g. a mechanical device to fix a flag, a waste bin, etc.; a socket plug-in device.

The modules 200, 300, 400 may be arranged in any order one above the other, and may be connected to the support pole 100 and to each other in any suitable way, e.g. using connectors 510, 520,530 as described in EP 3 076 073 B1 in the name of the applicant.

Figure 2A:
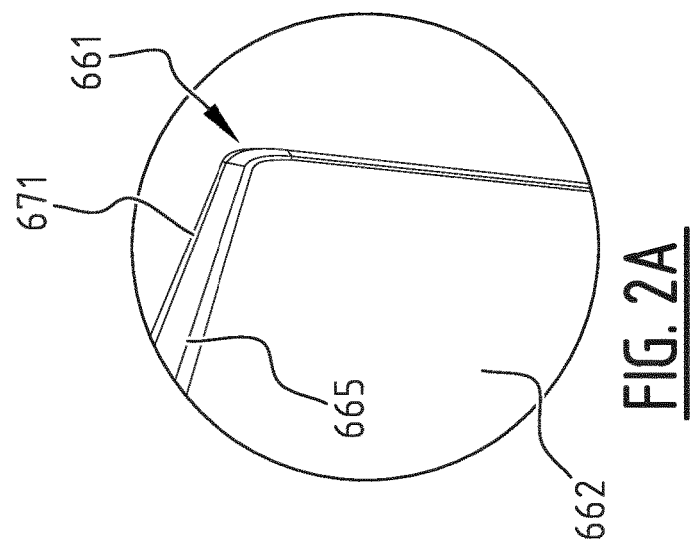
FIG. 2A is a detailed view of a portion of FIG. 2.
Figure 2:
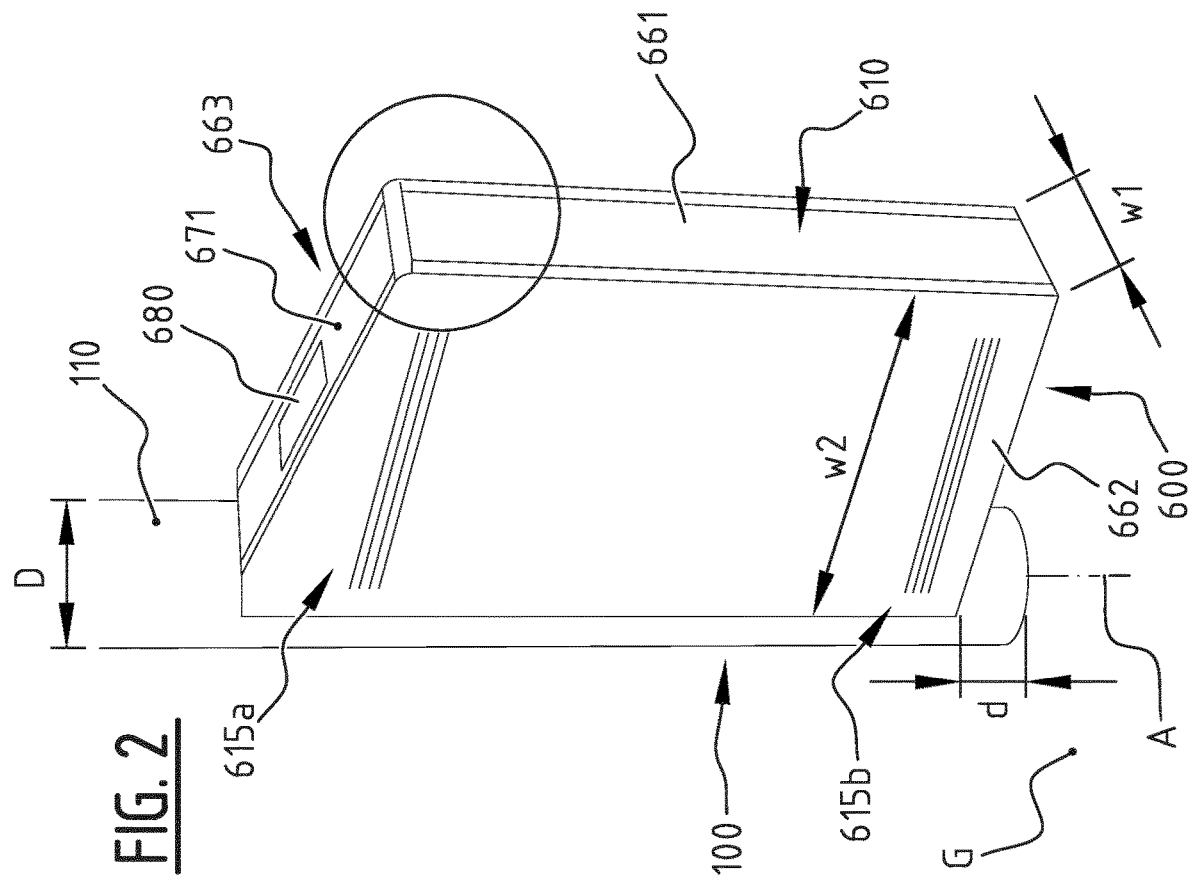
FIG. 2 is a schematic perspective view of an exemplary embodiment of a base station module fixed to a support module of a lamp post.
Figure 4:
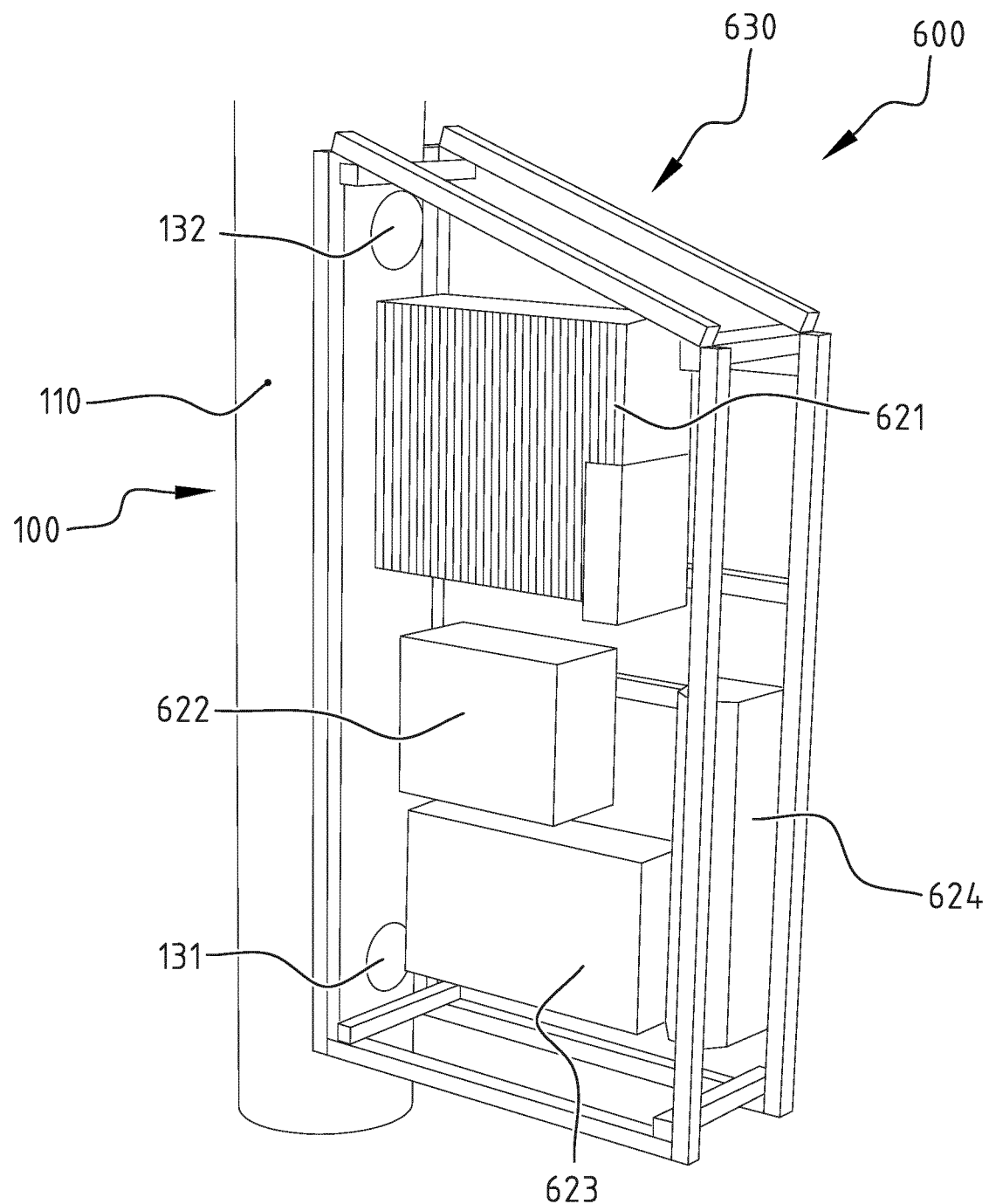
FIG. 4 is a schematic perspective view of an exemplary embodiment of a base station module without the panels of the housing but with the base station circuitry.

The plurality of modules further comprises a base station module 600 comprising a housing 610 and base station circuitry 621, 622, 623, 624 mounted in said housing 610, see also FIGS. 2 and 4. The base station circuitry 621, 622, 623, 624 is coupled to the antenna 350, see reference 710. The base station module 600 is attached to an external surface 110 of the support pole 100 and the weight thereof is carried by the support pole 100. As illustrated in FIG. 2, the support pole 100 may be fixed in the ground G and the housing of the base station module 600 may be at a distance d above the ground G. However, it is also possible to arrange the base station module more or less flush with the ground G.

The housing 610 of the base station module 600 comprises a structurally rigid ribbed frame 630 attached to the support pole 100; a fixing means 691, 692, e.g. at least two screws or bolts, for fixing the ribbed frame 630 against the external surface 110 of the support pole 100; and one or more panels 661, 662, 663 attached to the ribbed frame, so as to enclose the ribbed frame; see FIGS. 2-5. According to an exemplary embodiment, the housing 610 may be provided with one or more ventilation openings, e.g. a plurality of slits or holes. In the illustrated embodiment a plurality of slits 615a, 615b is arranged in the two opposite side panels 662, 663 of the housing, such that an air flow through the housing is created.

The ribbed frame 630 may comprises at least four upright girders 631, 632, 633, 634; at least four side girders 651, 652, 653, 654 extending in a first width direction perpendicular to an axial direction A of the support pole and connecting the four upright girders 631, 632, 633, 634; and at least four side girders 635, 636, 637, 638 extending in a plane perpendicular to the first width direction and connecting the four upright girders 631, 632, 633, 634. Optionally additional side girders 639, 640, 641 may be provided to facilitate the fixing of the base station circuitry. The ribbed frame 630 is attached to the support pole 100 at a first and second position being at a distance of each other seen in an axial direction of the support pole 100, using e.g. a first and second screw or bolt 691, 692 which passes through girders 642, 643. Optionally additional attachment positions may be provided to facilitate the attaching of the ribbed frame 630 to the support pole 100. In the illustrated embodiment the panels include two side panels 662, 663 and a central angled panel 661 intended to form the top and front side of the housing 610. The central panel 661 may be provided with edges 665 extending over the edges of the side panels 662, 663, as illustrated in FIG. 2A. Optionally a seal (not shown) may be arranged between the edges of adjacent panels. In that manner the risk that water and/or dirt enters in the housing 610 between the edges of the panels, is limited. The skilled person understands that the enclosure of the housing 610 may be formed by other ways, e.g. one integrated enclosure which can be placed around and fixed to the ribbed frame.

The support pole 100 is hollow, and is provided with a removable door 120 providing access to an inner part of said support pole 100, see FIG. 1. The door 120 is arranged substantially opposite to the base station module 600, so that an operator can access the interior of the base station module 600 through the door 120. However, it is also possible to remove one or more panels 661, 662, 663 of the housing 610, in order to access the base station circuitry 621, 622, 623, 624.

Figure 3:
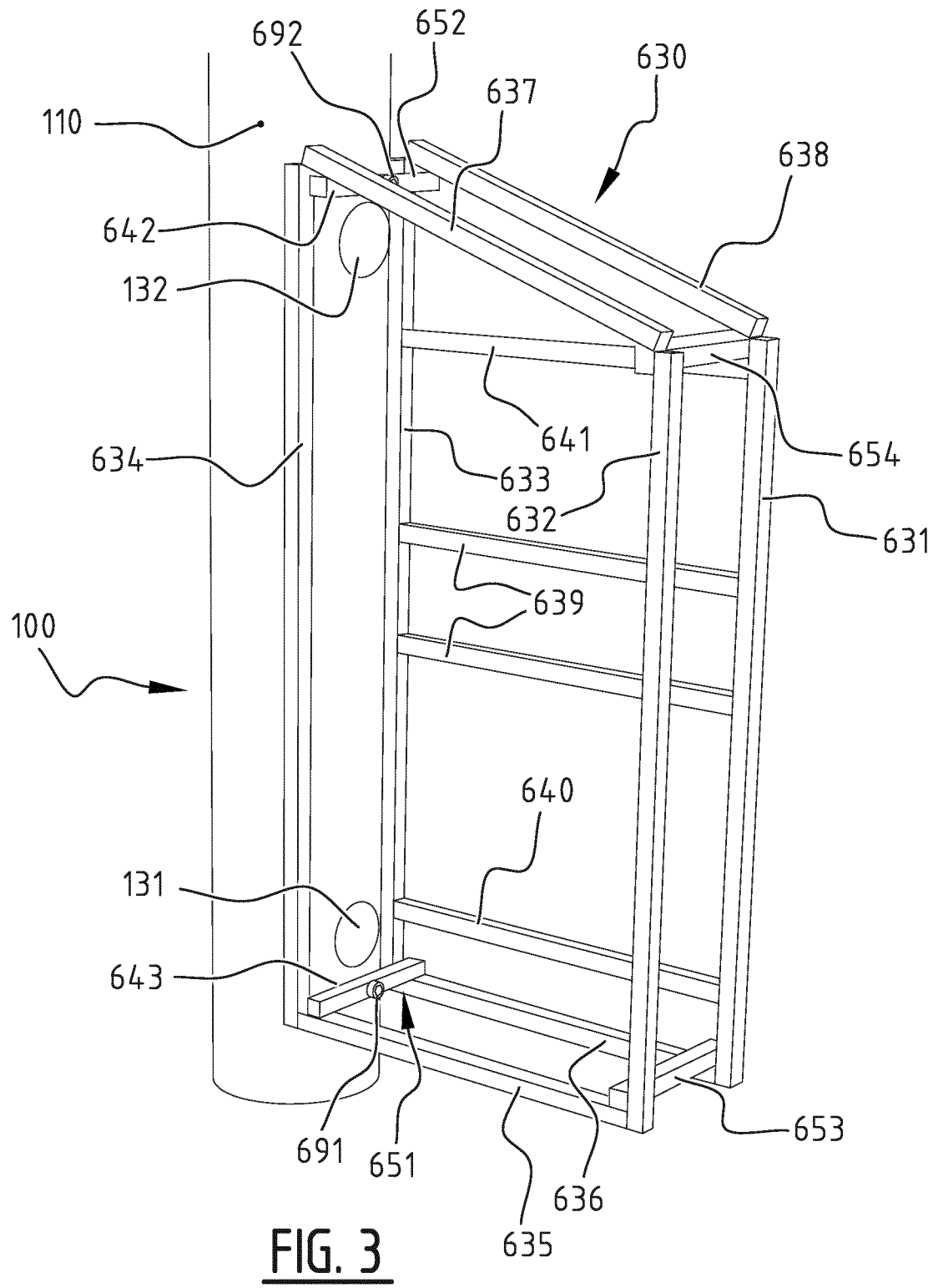
FIG. 3 is a schematic perspective view of an exemplary embodiment of a base station module without the panels of the housing and without the base station circuitry, to visualize the ribbed frame.

The housing 610 of the base station module 600 covers a surface area of the support pole 100; and the support pole 100 is provided in said surface area with a first hole 131 and a second hole 132 positioned above the first hole 131 seen in an axial direction of the support pole 100, see FIGS. 3 and 4. The lamp post 1000 comprises a connection cable 710 (see FIG. 1, not shown in FIGS. 3 and 4) from the antenna 350 through an inner part of the support pole 100, through the second hole 132 to the base station circuitry 621, 622, 623, 624; and a power connection cable 720 passing from a lower end of the support pole 100 through the first hole 131 to feed the base station circuitry 621, 622, 623, 624.

The housing 610 of the base station module 600 has a first width w1 extending in a first direction perpendicular to an axial direction A of the support pole 100, said first width w1 being inferior to an external diameter D of the support pole 100. The housing of the base station module 600 has a second width w2 extending in a second direction perpendicular to the first width and to the axial direction A of the support pole 100, said second width w2 being superior to an external diameter of the support pole 100, preferably at least twice the external diameter of the support pole 100. In that manner a relatively long and narrow compact casing 600 is obtained with a suitable shape for holding base station circuitry.

Figure 6:
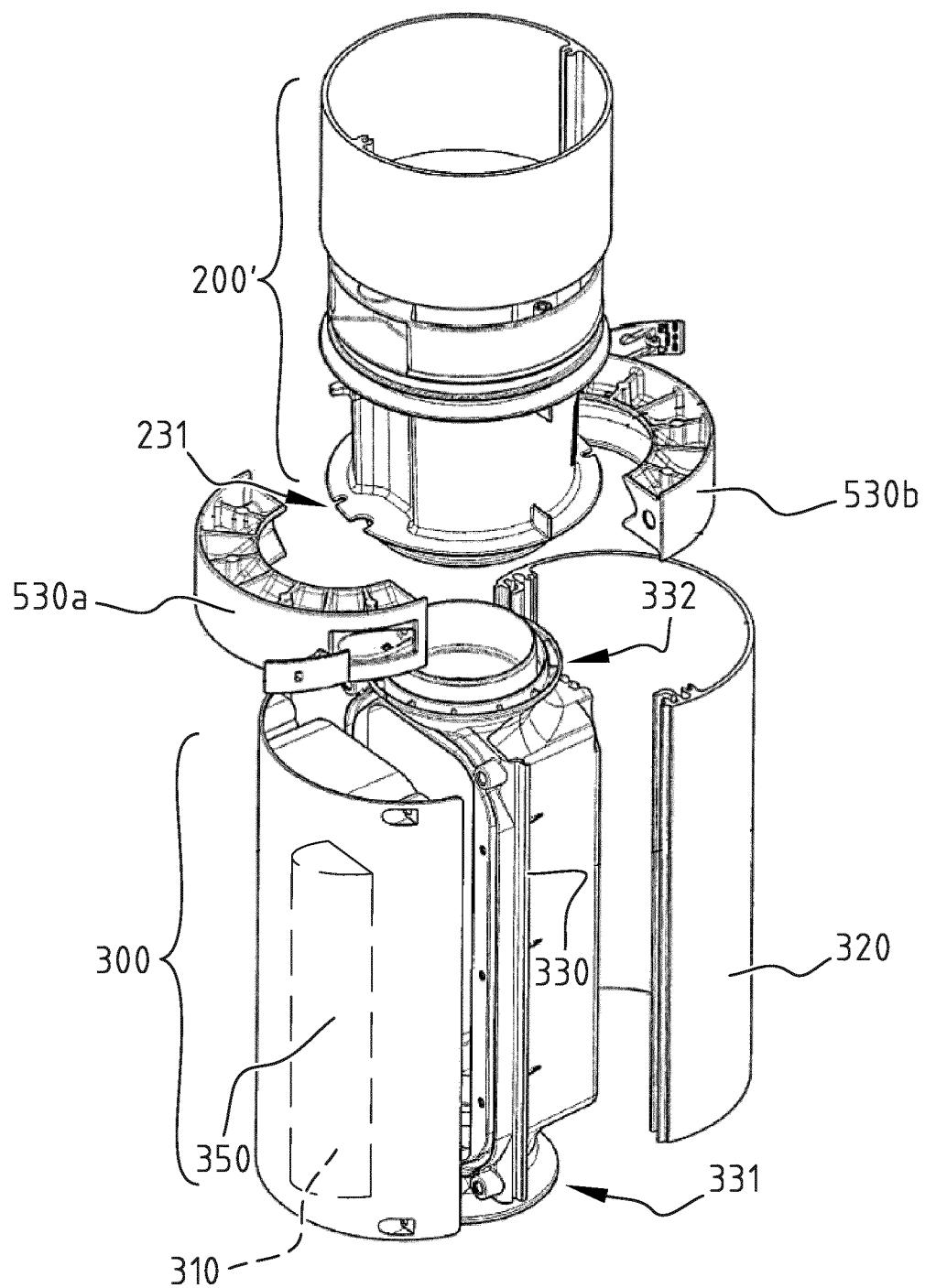
FIG. 6 is a schematic perspective view of an exemplary embodiment of an antenna module.

The antenna module 300 is arranged in a position above the base station module 600. The antenna module 300 is arranged between the base station module 600 and the light module 200, seen in an axial direction of the support pole 100. In an alternative embodiment the antenna module 300 could be arranged above the light module 200. The antenna 350 may be a directional antenna with a limited angular range, e.g. a range covering between 90° and 180°. The antenna module 300 has a housing 310, 320 which is arranged in line with the support pole 100. Preferably, the antenna module 300 is rotatable around an axis A of the support pole 100, such that said antenna module 300 is orientable for orienting the directionality of the receiving and emitting of the antenna 350. For example, the antenna may be included in a module as disclosed in EP 3 076 073 B1 which is included herein by reference. Such an example is illustrated in FIG. 6. By using module connectors 510, 520, 530 (see FIGS. 1 and 6, wherein only connector 530 is shown in FIG. 6) with two connector portions 530a, 530b which can be clamped around round end parts 331, 332 of the modules, the module 300 can be rotated around the axial direction A of the support pole 100 in a desired position and then fixed by the connector portions 530a, 530b. The antenna module 300 may comprise a central portion 330 including a passage for cables and wires and two cover portions 310, 320. The antenna 350 may be arranged against a face of the central portion 330 and covered by a first cover 310 in a non-metallic material e.g. a plastic material. The central portion 330 and the second cover 320 may be made of a metallic material to enhance the rigidity of the antenna module 300. Module 200' shown in FIG. 6 may be a light module or another additional module, e.g. a Wi-Fi transceiver module, a loudspeaker module, a camera module, a video surveillance module, etc.

As shown in FIG. 4 the base station circuitry comprises a combiner 622, a base transceiver unit 621; a wired or wireless transmission interface 623 configured for being connected to a communication network; and a power management unit 624. The combiner 622 is connected to the antenna 350 and to the base transceiver unit 621; and the base transceiver unit 621 is further connected to the transmission interface 623. The transmission interface 623 may be e.g. a fibre to copper interface.

Figure 5:
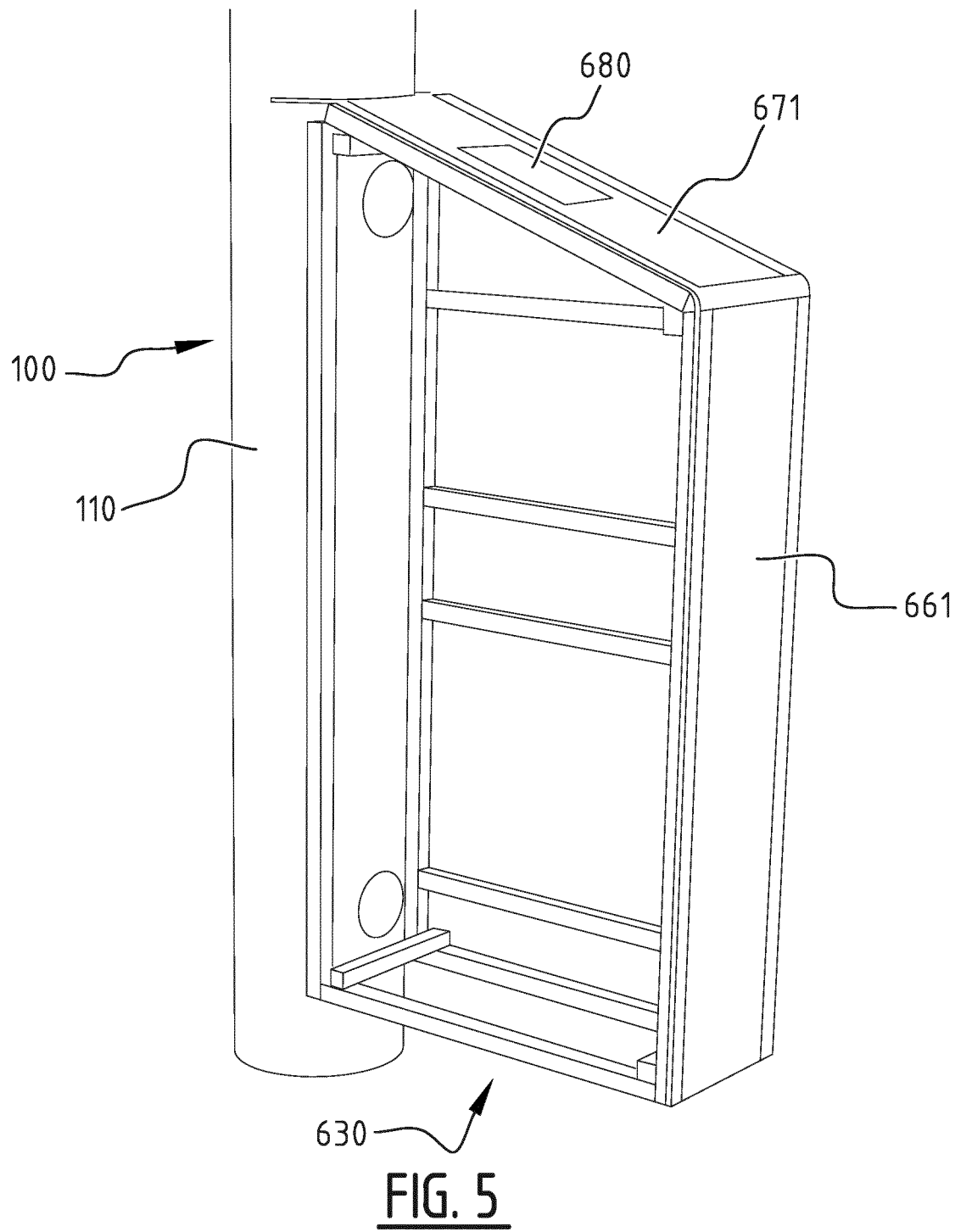
FIG. 5 is a schematic perspective view of an exemplary embodiment of a base station module with one panel of the housing, but without the side panels and without the base station circuitry.

In the illustrated embodiment of FIGS. 2 and 5 the housing 610 of the base station module 600 has an inclined upper surface 671, said upper surface sloping downward away from the support pole 100, wherein a display 680 and/or a battery charger and/or a sensor and/or a button and/or any other human interface devices (see also the examples given below) may be integrated in the inclined upper surface 671. In other embodiments the upper surface 671 may be a horizontal surface or a curved surface.

In the exemplary embodiments described above module 600 is a base station module. However, this module 600 may also be used to house different circuitry in addition to or instead of base station circuitry. Examples of other functional circuitry which may be included in the functional module in addition to or instead of the base station circuitry, are any one or more of the following:

power management circuitry comprising e.g. one or more of: a power meter, a fuse, a line protection, a circuit breaker, an electrical connection for multiple power lines, a clock, an astroclock, a power supply module, an PLC, a computer, a communication module, display circuitry, etc.; preferably the power management circuitry is configured to manage the provision of power to one or more lamp posts, preferably at least three lamp post, e.g. more than ten lamp posts. In such embodiments power connection cables pass from the functional module through the support pole to other lamp posts, e.g. underground.

telecommunication circuitry for wired or wireless communication, which can comprise at least one of: an optical fiber connection, a fiber to copper interface, a fiber patch panel, a modem, a router, a switch, a patch panel, a network video recorder (NVR), a computer;

audio system management circuitry which can comprise at least one of: an amplifier, a transformer, a media player (connected to network or not), electrical connections for multiple loudspeaker lines, a computer;

WiFi circuitry, wherein an antenna for receiving WiFi signals may be integrated either in the functional module or in a separate antenna module as in the exemplary embodiment of the lamp post with a base station module;

charger circuitry, e.g. phone/computer/tablet charger circuitry or vehicle charger circuitry or UAV charger circuitry (e.g. drone charger circuitry);

an environmental sensor such as a sound sensor, a microphone, a voice recorder, or a detector of $CO_2$, $NO_x$, smoke, or any other pollutant sensor, or an image sensor, etc., and the associated circuitry;

a human interface device (HID) and the associated circuitry, e.g. a camera, a loudspeaker, a button, a display, etc.;

a signaling device, e.g. a light ring capable of performing signaling;

a mechanical and/or electrical plug-in device, e.g. a universal plug-in module, e.g. a mechanical device to fix a flag, a waste bin, etc.; a socket plug-in device.

Figure 7:
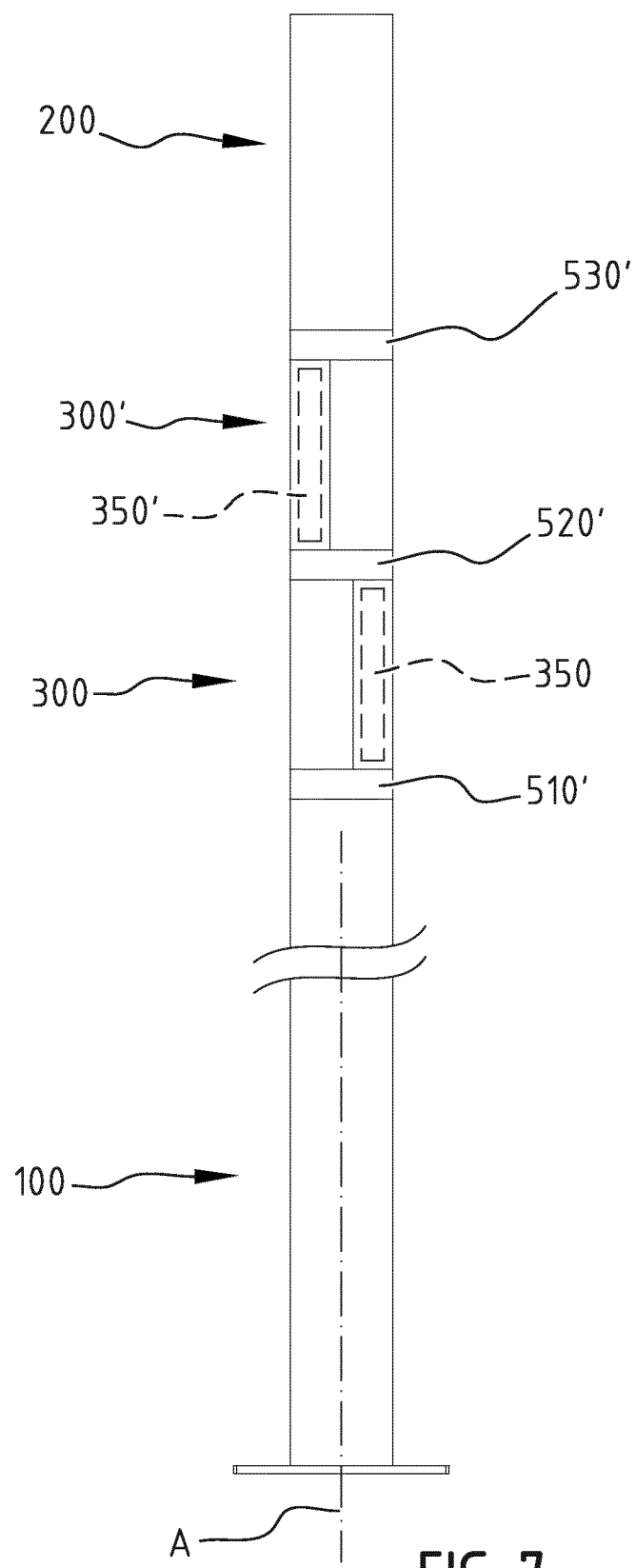
FIG. 7 illustrates schematically another exemplary embodiment of a lamp post of the invention.

FIG. 7 illustrates schematically an exemplary embodiment with two antenna modules. The lamp post comprises a support pole 100; a light module 200 comprising a light source; and a first and a second antenna module 300, 300'. The first and a second antenna module 300, 300' are arranged one above the other seen in an axial direction of the support pole 100 and are supported by the support pole 100. The first antenna module 300 comprises a first housing and a first directional antenna 350 arranged in said first housing and configured for receiving and emitting cellular data. The first antenna module 300 may be implemented e.g. as described above referring to FIG. 6. The second antenna module 300' may be the same or similar to the first antenna module 300, and comprises a second housing and a second directional antenna 350' arranged in said second housing and configured for receiving and emitting cellular data. The first and second antenna module 300, 300' are rotatable around the axial direction A of the support pole 100, such that said first and second antenna module 300, 300' are orientable for orienting the directionality of the receiving and emitting of the first and second directional antenna. The light module 200, the first antenna module 300 and the second antenna module 300 may be arranged in variable order one above another, aligned with the support pole 100, wherein optionally further modules are inserted in line with the support pole 100. Optionally, the lamp post 100 further comprises a functional module, such as a base station module (not shown) comprising base station circuitry; wherein the base station circuitry is coupled to the first and second directional antenna 350, 350'. Preferably the first and second antenna module 300, 300' are arranged in a position above the base station module. The first and second antenna module 300, 300' may be arranged between the base station module and the light module 200', seen in the axial direction of the support pole 100. The base station module may be implemented according to any one of the embodiments described above.

It is further noted that in embodiments of the invention base station functionalities and/or other functionalities may be either included in a module like base station module 600 fixed to the support pole, or in one or more modules 400 supported by the support pole 100 and aligned with the axial direction of the support pole 100. To that end the module 400 may have a larger diameter than the diameter of the support pole 100.

The base station module of the embodiment of the figures may be replaced with a similar functional module comprising other functional circuitry instead of or in addition to base station circuitry. The technical advantages set out above for the base station module apply mutatis mutandis for the functional module.

Figure 8:
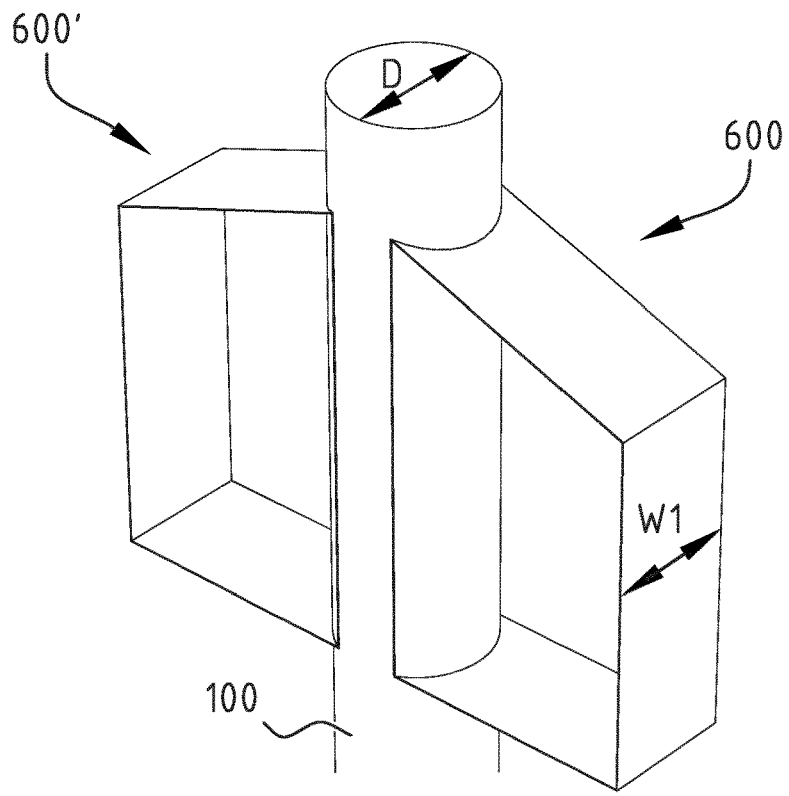
FIGS. 8 and 9 illustrate schematic perspective views of two other exemplary embodiments of a functional module for a lamp post.
Figure 9:
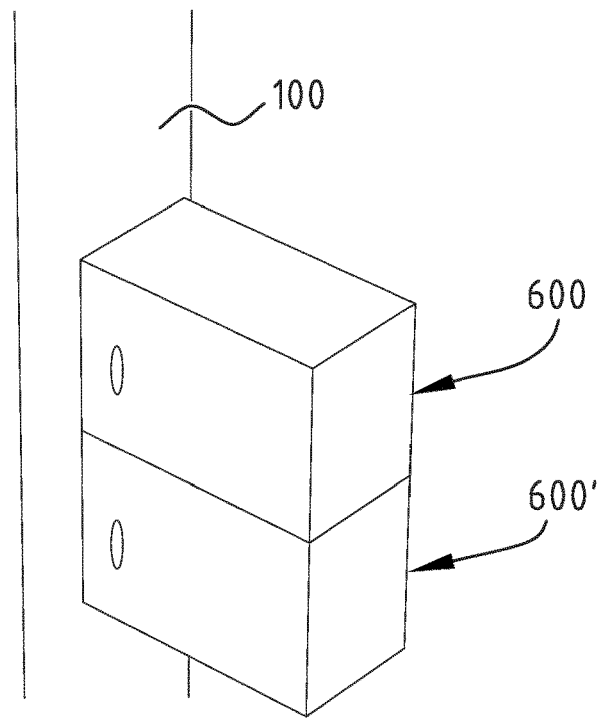

FIGS. 8 and 9 illustrate that multiple functional modules 600, 600' may be added to a single support pole. In the example of FIG. 8, two rather narrow (w1<D) functional modules 600, 600' are arranged on opposite sides of the support pole 100. Depending on the available space the functional modules 600, 600' may be aligned with each other or may be at an angle. The functional modules 600, 600' may have a similar or identical housing, but may contain different functional circuitry. In the example of FIG. 9 two functional modules 600, 600' are attached one above the other to the support pole 100. In such a configuration the top wall of the lower functional module 600' may be omitted. The skilled person understands that also more than two functional modules 600, 600' may be attached to and supported by the support pole 100 depending on the size and requirements of the lamp post.

Figure 10:
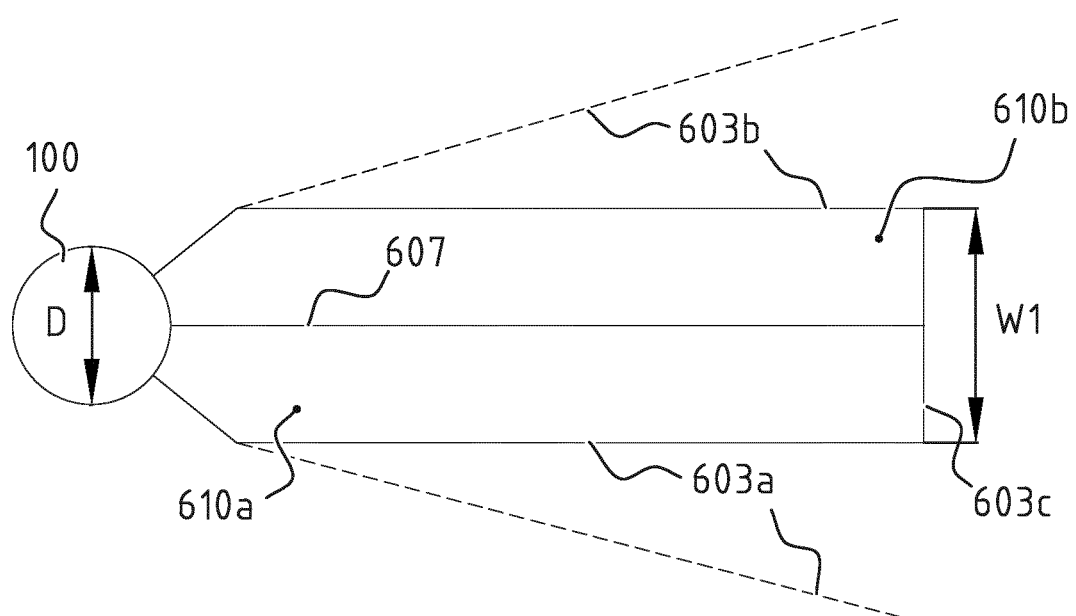
FIG. 10 illustrates schematically a top view of an exemplary embodiment of a functional module.

As illustrated in the top view of FIG. 10 the housing 610 of a functional module may be provided with a separation wall 607 dividing the internal space of the housing 610 into two compartments 610a, 610b. However, the housing 610 may also comprise only one compartment as illustrated in FIG. 1. In FIG. 10, the two compartments comprise a first and a second compartment 610a, 610b separated by a vertical separation wall 607, and a first door 603a and a second door 603b provide access to the first and second compartment 610a, 610b, respectively. The vertical separation wall 607 extends from the support pole outwardly, here in a radial plane, creating the first and second compartment 610a, 610b on opposite sides thereof. In FIG. 1, one compartment is accessible from two sides through the two side doors 603a, 603b. Alternatively there may be provided only one side door 603a. In FIG. 10, the first door and the second door 603a, 603b form opposite wall portions of a peripheral wall.

Figure 11A:
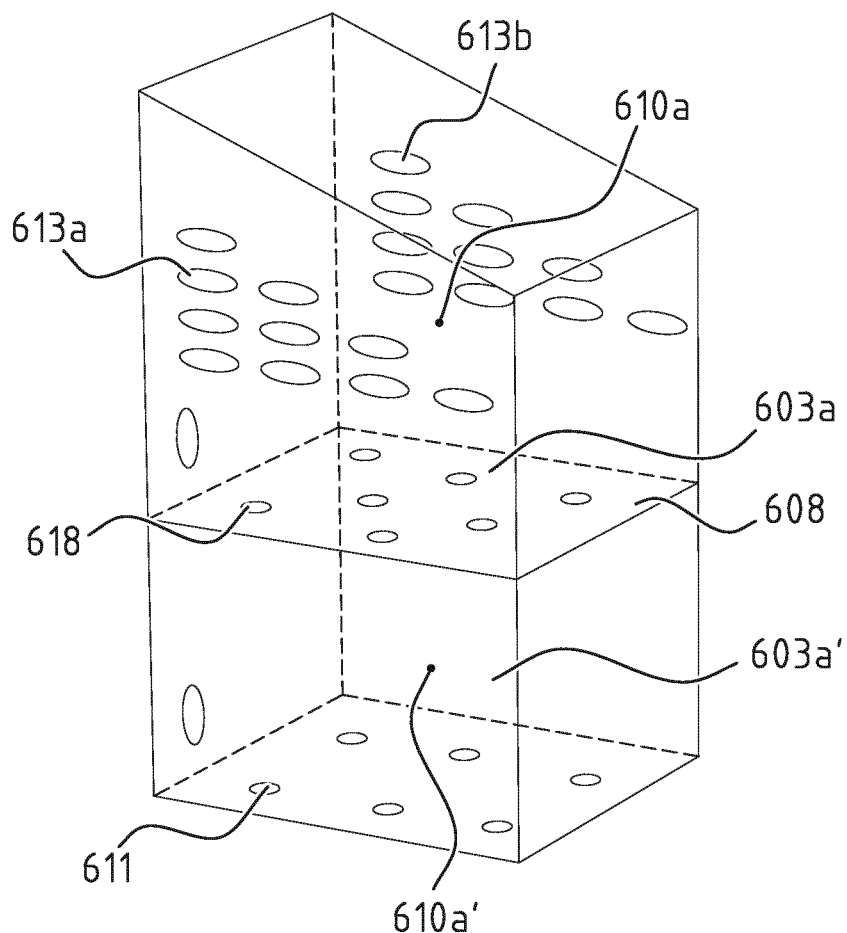
FIGS. 11A-11C illustrate schematically possible door combinations of a functional module according to exemplary embodiments.
Figure 11B:
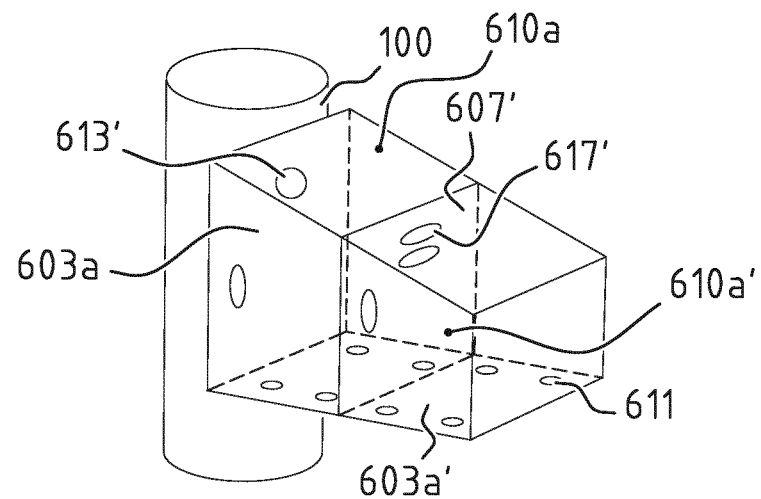
Figure 11C:
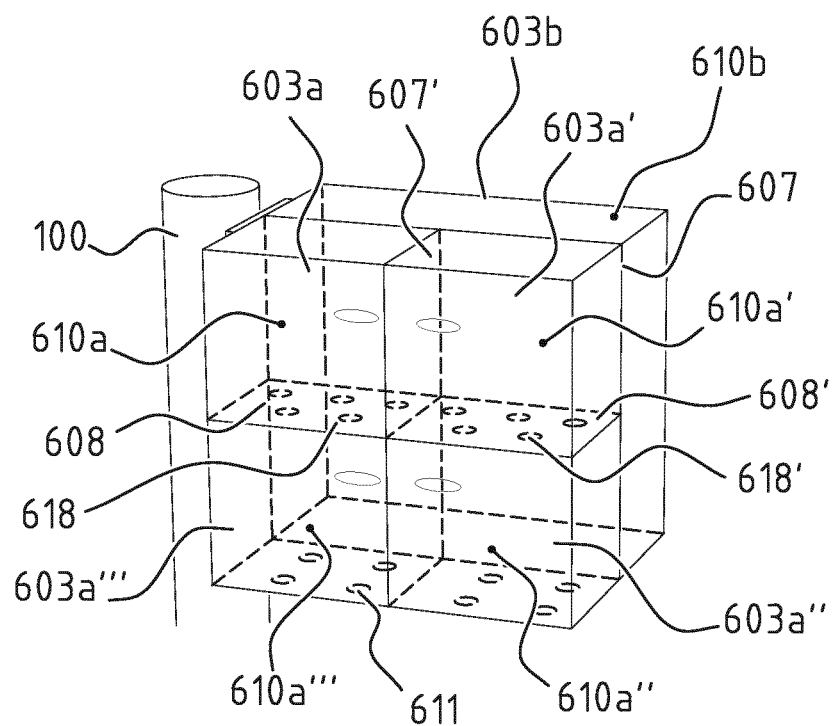

In other embodiments, illustrated in FIGS. 11A-11C, a first door and second door 603a, 603a' form adjacent wall portions of the peripheral wall.

In FIG. 11A a first and a second compartment 610a, 610a' are separated by a horizontal separation wall 608 and the first and second door 603a, 603a' provide access to the first and second compartment 610a, 610a', respectively. The second door 603a' is located below the first door 603a. The housing is provided with one or more ventilation openings, e.g. a plurality of slits or holes. In the illustrated embodiment a plurality of slits 613a, 613b is arranged in the two opposite side doors 603a, 603b of the peripheral wall of the housing, and a plurality of lower air flow holes 611 is provided in the bottom wall 601, such that an upward air flow through the housing is created. The horizontal separation wall 608 may be provided with one or more air flow holes 618 to allow the passage of air from the second compartment 610a' to the first compartment 610. The upper air flow holes 613a, 613b are then preferably provided in a wall portion of the peripheral wall delimiting the first and second compartment 610a, 610a' and/or in a portion of the support pole delimiting the first compartment 610a. For example, as shown, upper air flow holes 613a may be provided in an upper portion of the first door 603a which is part of the peripheral wall. Optionally a vertical separation wall (not shown in FIG. 11A) may be provided, as in the embodiment of FIG. 10. Such a vertical separation wall may be provided in one or in both of the first and second compartments 610a, 610a'.

In FIG. 11B the vertical separation wall 607' extends at a distance of the support pole creating two adjacent compartments 610a, 610a', one closer to the support pole 100 and one further away from the support pole 100. The first door and the second door 603a, 603b may then form adjacent wall portions of the peripheral wall. The separation wall 607' may be provided with one or more air flow holes 617' to allow the passage of air from the second compartment 610a' to the first compartment 610. One or more upper air flow holes 613' are then preferably provided in a wall portion of the peripheral wall delimiting the compartments 610a, 610a' and/or in a portion of the support pole delimiting the first compartment 610a. For example, upper air flow holes (not shown) may be provided in upper portions of the first and second door 603a, 603a' which are part of the peripheral wall.

The skilled person understands that also various combinations with more than two compartments are possible. For example in FIG. 11C one radial separation wall 607 is provided with four smaller compartments 610a, 610a', 610a", 610a'" on one side and one bigger compartment 610b on the other side. The four smaller compartments 610a, 610a', 610a", 610a'" are separated from one another by a further vertical separation wall 607' and two horizontal separation walls 608, 608'. The four smaller compartments 610a, 610a', 610a", 610a'" are accessible through separate side doors 603a, 603a', 603a", 603a'", respectively. The bigger compartment 610b is accessible through a bigger side door 603b. The horizontal separation walls 608, 608' may be provided with one or more air flow holes 618, 618' to allow the passage of air from the compartments 610a", 610a'" to the compartments 610a, 610a'. The upper air flow holes (not shown) may be provided in a wall portion of the peripheral wall delimiting the compartments 610a, 610a', 610a", 610a'", 610b and/or in a portion of the support pole 100 delimiting the compartments 610a, 610a'", 610b.

Whilst the principles of the invention have been set out above in connection with specific embodiments, it is to be understood that this description is merely made by way of example and not as a limitation of the scope of protection which is determined by the appended claims.

The invention claimed is:
1. A lamp post comprising:
a support pole;
a light module supported by the support pole, said light module comprising a light source;
an antenna module supported by the support pole, said antenna module comprising an antenna configured for receiving and emitting cellular data; and
a base station module, wherein the base station module comprises a housing and base station circuitry mounted in said housing, wherein the base station circuitry is coupled to the antenna, wherein the base station module is attached to an external surface of the support pole and carried by the support pole, and wherein the housing of the base station module has a first width extending in a first direction perpendicular to an axial direction of the support pole, said first width being inferior to an external diameter of the support pole, and has a second width extending in a second direction perpendicular to the first width and to the axial direction of the support pole, said second width being at least twice the external diameter of the support pole.

2. The lamp post of claim 1, wherein the support pole is fixed in the ground and the housing of the base station module is at a distance above the ground.

3. The lamp post of claim 1, wherein the support pole is hollow, wherein the support pole is provided with a removable door providing access to an inner part of said support pole, and wherein said door is arranged substantially opposite to the base station module.

4. The lamp post of claim 1, wherein the housing of the base station module covers a surface area of the support pole, wherein the support pole is provided in said surface area with a first hole and a second hole positioned above the first hole seen in an axial direction of the support pole, and wherein the lamp post comprises a connection cable from the antenna through an inner part of the support pole, through the second hole to the base station circuitry, and a power connection cable passing from a lower end of the support pole through the first hole to feed the base station circuitry.

5. The lamp post of claim 1, wherein the housing of the base station module has an inclined upper surface sloping downward away from the support pole, and wherein a human interface device comprising a display, a charger, a sensor, or a button is integrated in the upper surface.

6. A lamp post comprising:
a support pole;
a light module supported by the support pole, said light module comprising a light source; and
a functional module, wherein the functional module comprises a housing and functional circuitry mounted in said housing, wherein the functional module is carried by the support pole, and wherein said housing comprises a ribbed frame, a fixing means within the housing of the functional module for fixing the ribbed frame against the external surface of the support pole, and one or more panels attached to the ribbed frame, so as to enclose the ribbed frame.

7. The lamp post of claim 6, wherein the support pole is fixed in the ground and the housing of the functional module is at a distance of the ground.

8. The lamp post of claim 6, wherein the ribbed frame is attached to the support pole at a first and second position being at a distance of each other seen in an axial direction of the support pole.

9. The lamp post of claim 6, wherein the support pole is hollow, wherein the support pole is provided with a removable door providing access to an inner part of said support pole, and wherein said door is arranged substantially opposite to the functional module.

10. The lamp post of claim 6, wherein the housing of the functional module has a first width extending in a first direction perpendicular to an axial direction of the support pole, said first width being inferior to an external diameter of the support pole.

11. The lamp post of claim 6, wherein the housing of the functional module has an inclined upper surface sloping downward away from the support pole, and wherein a human interface device is integrated in the upper surface.

12. The lamp post of claim 6, wherein a peripheral wall of the housing comprises at least two side doors for providing access to an internal space of the housing.

13. The lamp post of claim 12, wherein one or each of the side doors is provided with a three-point locking device.

14. The lamp post of claim 12, wherein the housing is provided with at least one separation wall dividing the internal space of the housing into at least two compartments, and wherein the at least two compartments are accessible by the at least two side doors.

15. The lamp post of claim 6, wherein the housing comprises a bottom wall configured to be floating, a top wall, and a peripheral wall between the bottom and top wall, said housing covering or surrounding a portion of the support pole, wherein the bottom wall is provided with one or more lower air flow holes, and wherein at least one of the peripheral wall or said portion of the support pole is provided with one or more upper air flow holes.

16. The lamp post of claim 6, wherein the ribbed frame comprises:
at least four upright girders;
at least four side girders extending in a first width direction perpendicular to an axial direction of the support pole and connecting the four upright girders; and
at least four side girders extending in a plane perpendicular to the first width direction and connecting the four upright girders.

17. The lamp post of claim 16, wherein the ribbed frame is attached to the support pole at said first and second positions using a first and second screw or bolt which respectively passes through a first and second girder of the at least four side girders extending in said first width direction.

18. A lamp post comprising:
- a support pole;
- a light module supported by the support pole, said light module comprising a light source; and
- a first antenna module and a second antenna module which are arranged one above the other seen in an axial direction of the support pole and which are supported by the support pole, said first antenna module comprising a first housing and a first directional antenna arranged in said first housing and configured for receiving or emitting cellular data, said second antenna module comprising a second housing and a second directional antenna arranged in said second housing and configured for receiving or emitting cellular data, said first and second antenna modules being rotatable around the axial direction of the support pole, such that said first and second antenna modules are individually orientable for orienting the directionality of the receiving and emitting of the first directional antenna and the second directional antenna, wherein the first and second housing each comprises a central portion including a passage for cables and wires, and at least one cover portion surrounding the central portion.

19. The lamp post of claim 18, wherein the light module, the first antenna module, and the second antenna module are arranged in variable order one above another, aligned with the support pole.

20. The lamp post of claim 18, wherein the at least one cover portion comprises a first cover portion, and a second cover portion, said first and second cover portions surrounding the central portion, wherein at least one of the first antenna or the second antenna is arranged between the first cover portion and the central portion.

* * * * *